March 2, 1937.  J. EGGERT ET AL  2,072,396
PRINTING LENTICULAR FILM
Filed Feb. 27, 1934  2 Sheets-Sheet 1
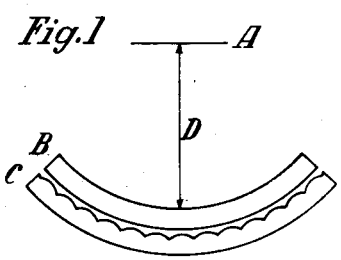
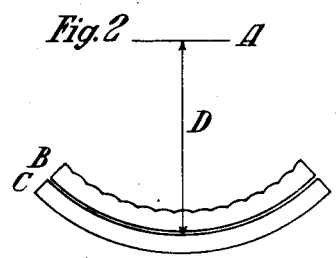
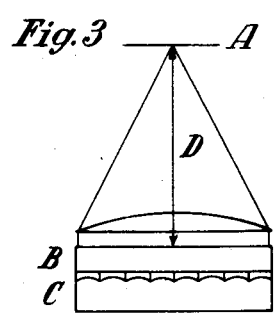
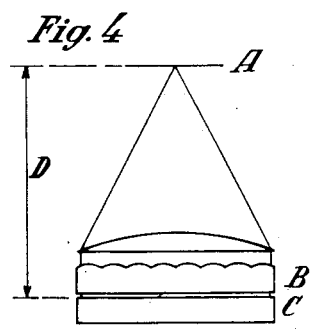
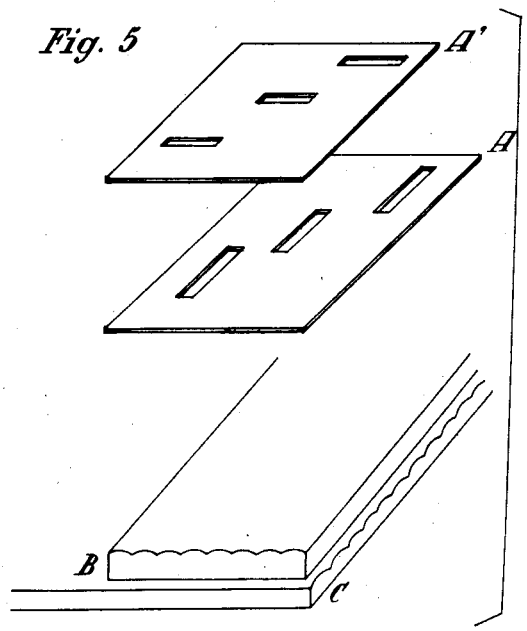
Inventors:
John Eggert,
Gerd Heymer,
By Attorneys
Potter, Pierce & Scheffler March 2, 1937.  J. EGGERT ET AL  2,072,396
PRINTING LENTICULAR FILM
Filed Feb. 27, 1934  2 Sheets-Sheet 2
Fig. 7
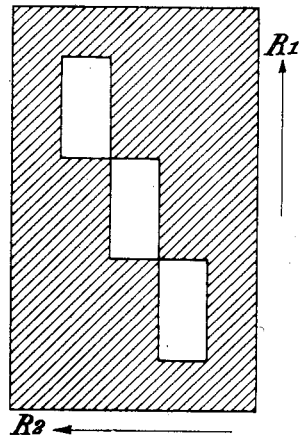
Fig. 8
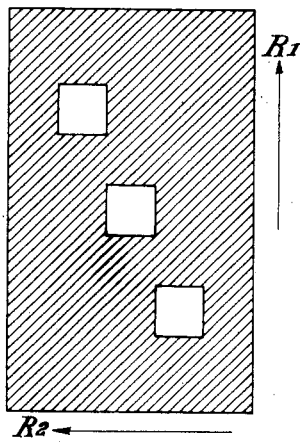
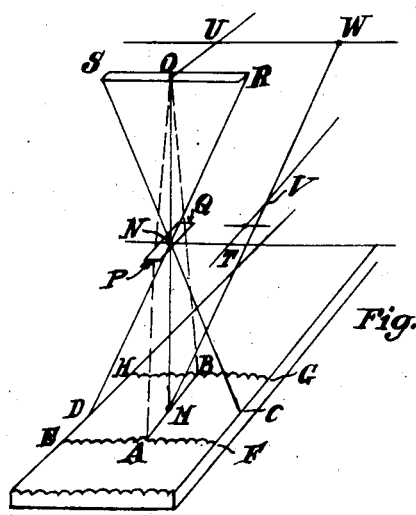
Fig. 6.
Inventors:
John Eggert,
Gerd Heymer,
By Attorneys
Potter, Piera + Scheffler Patented Mar. 2, 1937

2,072,396

UNITED STATES PATENT OFFICE 2,072,396

PRINTING LENTICULAR FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application February 27, 1934, Serial No. 713,186
In Germany February 28, 1933

9 Claims. (Cl. 95—75)

Our present invention relates to printing of lenticular films and more particularly to contact printing of lenticular films.

One of its objects is a process of contact printing a lenticular film bearing an original on another lenticular film. Further objects will be seen from the detailed specification following hereafter. Reference is made to the accompanying drawings in which Fig. 1 shows an arrangement for printing according to this invention, Fig. 2 shows an arrangement for printing according to this invention similar to that shown in Fig. 1 but in which the filter was arranged at infinity when taking the original, Fig. 3 shows a modified arrangement for printing according to this invention, Fig. 4 shows an arrangement similar to that shown in Fig. 3 but in which the filter was arranged at infinity when taking the original, Fig. 5 shows a further modification for printing in accordance with the invention, Fig. 6 shows the determination of the filters or masks and their position for printing in accordance with the modification shown in Fig. 5, Fig. 7 shows a diaphragm for printing according to this invention, and Fig. 8 shows another diaphragm for printing according to this invention.

A known method of printing a lenticular film on another lenticular film consists in placing the emulsion side of the original film in contact with the embossed side of the printing film with the lenticular elements of the two films at an angle of at least 45° to each other, and using a diaphragm having as many apertures as correspond with the number of fundamental colors of the filter that was used for the exposure of the original. The apertures are shaped so as to produce a separation of the trace of the rays co-ordinated with the single primary colors in the direction perpendicular to the direction of the lenticular elements. The distance from the film and the size of this stepped diaphragm correspond with the size and the distance from the film of the virtual image of the filter during the exposure of the original. According to this process a print is obtained which, for being reproduced in its true colors, requires the projection filter to be placed at a distance which is equal to that of the stepped diaphragm from the film during printing.

The object of the present invention is a process of printing a lenticular film on another lenticular film by contact arranged with the smooth side of the original facing the lenticular elements of the printing film and with the lenticular elements forming an angle, by which prints are obtained which can be projected with a projection filter arranged at any required distance from the film and having any required breadth. For this purpose there is arranged, between the source of light and the original film one or more diaphragms having apertures which in number correspond with the number of the fundamental colors of the multi-color filter used in exposure. The form of these apertures and their positions with relation to the films or the position of the films with relation to the diaphragm are so chosen that the print is produced under conditions involving a distance of the projection filter from the film different from that of the exposure filter and/or, if required, a breadth of the projection filter different from that of the exposure filter. The process of the invention includes various modifications which all comply with the aforesaid conditions.

All these modifications have the common feature that the distance of the multi-color filter from the original and the breadth of the multi-color filter is the same both in the exposure and in the printing, that is to say, the distance and the breadth of the multi-color filter can be changed only with relation to the film to be printed on. The following principle governs the invention:

The original and the film to be printed on are illuminated by the same source of light. For every primary color there exists a co-ordinate plane with relation to the original and the film to be printed on. The trace of the rays is such that the angles of inclination for a component color or primary color correspond with relation to the film to be printed on to the required conditions of the projection filter with relation to the print and with relation to the original in printing to the conditions of the exposure filter with relation to the original. In order to produce the difference of incidence of the trace of the rays for the two directions of the lenticular elements there are suitable all means which permit of a two dimensional change of the incidence of light rays on lenticular film, such as cylindrical lenses, bending the film without altering the parallelism of the lenticular elements, displacement of the apertures of the diaphragm without simultaneous displacement in the direction parallel to the lenticular elements.

The process according to the present invention will now be more fully described with reference to the accompanying drawings.

Referring to Fig. 1, A represents a stepped diaphragm. B is the original lenticular film and C is the lenticular film to be printed on. The lenticular embossing of the original film extends in the direction parallel to the plane of the paper, whereas that of the printing film extends perpendicularly thereto. The two films are bent to form a cylinder with its axis parallel to the direction of the lenticular elements of the printing film. In this arrangement the distance of the filter from the original remains unchanged and is determined by the distance D of the original from the stepped diaphragm of the kind shown in Figs. 7 and 8. All green middle lines, that is to say the lines connecting the borders of the picture field with the central line of the middle, generally the green color area, are perpendicular to the printing film. During projection, the filter image must have such a position that in this case, too, the green middle lines are perpendicular to the film plane, that is to say, the distance of projection filter must be equal to infinity. The bending of the films is dependent on the distance of the projection filter from the print, in that the angle between the green middle line of a lenticular element at the margin of the curved film to be printed on and the corresponding tangent drawn in the point where this green middle line cuts the film to be pointed on is equal to that between the film plane and the green middle line of one of the lenticular elements at the border of the film in projection.

In Fig. 2 the lenticular elements of the two films again extend at an angle of 90° to each other. In this case the lenticular elements of the original film are perpendicular to the plane of the paper, while those of the printing film are parallel thereto. In this case the distance of the filter from the original film during the exposure was equal to infinity, that is to say, during the exposure all the green middle lines were perpendicular to the original film. Of this original film a print is obtained, which is to be projected with a filter the distance of which is equal to the distance D of the printing film from the plane of the stepped diaphragm.

In the embodiments illustrated in Figs. 3 and 4 the alteration of the filter distance from the original and the printing film is produced by placing a cylindrical lens above the original film. A is a stepped diaphragm, B is the original film and C is the printing film.

In Fig. 3 the axis of the cylindrical lens is parallel to the direction of the lenticular elements of the printing film. The cylindrical lens therefore, only produces an alteration of the filter distance for the print, whereas the distance of the original film is equal to the distance D of the stepped diaphragm A from the original film B. With the arrangement shown in Fig. 3 the projection filter must be arranged at infinity with relation to the print. In Fig. 4 the lenticular elements of the printing film are parallel to the plane of the paper, those of the original film are perpendicular thereto. In this case the axis of the cylindrical lens is parallel to the lenticulation of the original film. Therefore, the distance D of the stepped diaphragm A from the printing film C is the distance of the projection filter from the print. Inasmuch as the cylindrical lens modifies only the filter distance of the film with the lenticular elements extending in the direction of the axis of the cylindrical lens, the original had to be taken with a filter distance equal to infinity for the arrangement shown in Fig. 4.

Fig. 5 illustrates a modification of the process according to this invention, wherein two diaphragms are used, placed behind each other in different planes. The diaphragms have slotted openings which in their longitudinal direction run parallel to the lenticular elements of the coordinated films. A and A' are the two diaphragms, B is the original film and C is the printing film. For the sake of clearness the arrangement shown in Fig. 5 is perspective. The slot openings of the diaphragm A extend parallel to the lenticular embossing of the original film B and the like openings of the diaphragm A' extend parallel to the lenticular embossing of the printing film C. The openings of the diaphragm A, co-ordinated to the original film are arranged so that their central lines correspond as to position with those of the filter areas of the exposure filter. The openings of the diaphragm A', parallel to the lenticular embossing of the printing film are arranged so that their central lines correspond as to position with those of the projection filter. The distance of the diaphragm A from the original is determined by the distance of the filter image during the exposure. The distance of the diaphragm A' from the printing film depends on the distance of the projection filter. The arrangement according to Fig. 5 therefore permits the production from any desired original, of a print capable of projection with any desired distance of the filter from the print because the position of the diaphragm co-ordinated with the printing film may be varied within wide limits. The slot openings of the diaphragm A' must be so chosen that sufficient light is projected on every part of the film after passing the diaphragm A. This condition is fulfilled if an illuminated rectangle of the diaphragm A' is visible from any point within the picture field.

The construction and the determination of the position of the diaphragm to be used for projection will now be described with reference to Fig. 6. The film shown in this figure is the original. A, B, C and D are the centers of the edges of a picture. The position N of the optical center of, for instance, the green filter strip co-ordinated with the original is the same as it was in the exposure of the original. From M, the center of the picture ABCD there is drawn the line MN on which there is marked the point O according to the desired distance of the projection filter from the print. The point P at which the line OA intersects the plane in which the filter co-ordinated with the original is situated and the point Q at which the line OB intersects this plane determine the length of the diaphragm opening corresponding with the green filter strip of the exposure filter. The planes determined by the edges FG and EH of the picture field and M intersect the plane of the projection filter at lines drawn through S and R by which the length of the slot corresponding with the green filter strip of the projection filter is determined. The breadth of the respective slots in the exposure and projection filter is at most equal to the breadth of corresponding filter strips of the exposure and projection filter or their virtual images.

The same principles are applicable for the construction of the lateral slots of the diaphragm used in printing. The distance of the central lines of these slots is selected according to those required for the lateral filter strips of the projection filter. This distance is in Fig. 6 equal to OU. The optical center of one of the lateral slots is then obtained as the point of intersection of the plane through the central slot, the plane determined by M and the parallel to the central line of the middle slot through U, and the plane determined by M and the central line TV of the corresponding filter strip of the exposure filter. This point is W. The length and the breadth of the slot are determined by a method analogous to that described above for the central slot.

The construction of the two diaphragms for printing according to this invention has been described for the arrangement in which the lenticular elements of the films run perpendicular to each other. If this is not the case, the optical center of the middle slot is found in just the same manner, but the slot extends parallel to the lenticular elements of the film to be printed on and not parallel to the edges of the picture field. The length of the slots is determined in the same manner as above set forth, in accordance with the condition that the slot must be visible from every point of the picture field.

If the distance of the projection filter is the same as the distance of the exposure filter it is nevertheless possible to conduct the printing process in such a manner that a projection filter can be used with the optical centers of the filter strips more distant from each other than the optical centers of the exposure filter. In Figs. 7 and 8 there are shown diaphragms for use in printing films to be projected with the same filter distance as was used in exposure, however, the distance of the optical centers of the projection filter is double that of the optical centers of the exposure filter. In the figures the arrows $R_1$ and $R_2$ indicate the direction of the lenticular elements of the printing film and the original respectively. In Fig. 7 the area of the one slot of the diaphragm is double that of one slot of Fig. 8.

As above pointed out the modification of the printing process according to this invention described with reference to Figs. 5 and 6 may be used with films having their lenticular elements at an angle between 45 and 90°; if the angle is less, printing is likewise possible, but increasing moirée effects will occur the smaller is the angle. In the case of the modifications shown in Figs. 1 to 4 the lenticular elements should be at a right angle, however, printing is possible with more or less success down to an angle of about 85°.

What we claim is:

1. In an apparatus for printing lenticular film on lenticular film in combination, a lenticular film bearing an original and a printing film in contact, with their lenticular elements forming an angle and with the smooth side of the original facing the embossed side of the printing film, a source of light arranged on the side of the original, and means for controlling the light projected on the films so that the incidence of the light rays projected on the original corresponds with the incidence of the light rays of each partial color on the original in taking and that simultaneously the incidence of the light rays projected on the printing film is changed to a predetermined value corresponding to the incidence of the light rays of each partial color to be used on the printed film in projection.

2. In an apparatus for printing lenticular film on lenticular film in combination, a lenticular film bearing an original and a printing film in contact, with their lenticular elements forming an angle of about 90° and with the smooth side of the original facing the embossed side of the printing film, a source of light arranged on the side of the original, means for masking said source of light arranged between said source of light and said films, said films being bent to a cylindrical plane having its axis parallel to the direction of the lenticular elements of one of the films with a radius of curvature that the angle between a line from the center of said masking means to the border of the film having its lenticular elements parallel with the cylinder axis and the tangent erected in said border corresponds with the angle between the line from the center of the multi-color filter co-ordinate with said film having its lenticular elements parallel with said cylinder axis to the border of this film and the corresponding film plane, said masking means being arranged at a distance from the film having its lenticular elements extending perpendicularly to said cylinder axis corresponding with that at which the co-ordinate multi-color filter is arranged, and intercepting all light rays except those having on the original the incidence corresponding with that of each partial color on the original in taking and on the printing film that which corresponds with that of each partial color on the print in projection, so that the incidence of the light rays projected on the printing film is changed to a predetermined value corresponding to the incidence of the light rays of each partial color to be used on the printed film in projection.

3. In an apparatus for printing lenticular film on lenticular film in combination, a lenticular film bearing an original and a printing film in contact, with their lenticular elements forming an angle of about 90° and with the smooth side of the original facing the embossed side of the printing film, a source of light arranged on the side of the original, means for masking said source of light arranged between said source of light and said films, at the distance of the multi-color filter co-ordinated with one of the films, an optical element inserted between the films and said masking means adapted to displace said masking means to the distance of the multi-color filter co-ordinated with the other film when viewed from this film, said masking means intercepting all light rays except those having on the original the incidence corresponding with that of each partial color on the original in taking and on the printing film that which corresponds with that of each partial color on the print in projection, so that the incidence of the light rays projected on the printing film is changed to a predetermined value corresponding to the incidence of the light rays of each partial color to be used on the printed film in projection.

4. In an apparatus for printing lenticular film on lenticular film in combination, a lenticular film bearing an original and a printing film in contact, with their lenticular elements forming an angle of about 90° and with the smooth side of the original facing the embossed side of the printing film, a source of light arranged on the side of the original, means for masking said source of light arranged on the side of the original, means for masking said source of light arranged between said source of light and said masking means at the distance co-ordinated with one of the films, a cylindrical lens inserted between the films and said masking means in close proximity of the films adapted to displace said masking means to the distance of the multi-color filter co-ordinated with the other film when viewed from said other film, said masking means intercepting all light rays except those having on the original the incidence corresponding with that of each partial color on the original in taking and on the printing film that which corresponds with that of each partial color on the print in projection, so that the incidence of the light rays projected on the printing film is changed to a predetermined value corresponding to the incidence of the light rays of each partial color to be used on the printed film in projection.

5. In an apparatus for printing lenticular film on lenticular film in combination, a lenticular film bearing an original and a printing film in contact, with their lenticular elements forming an angle of at least 45° and with the smooth side of the original facing the embossed side of the printing film, a source of light arranged on the side of the original, a first diaphragm arranged between said source of light and said films at a distance from the original corresponding to that at which the multi-color filter was arranged from the original in taking and having slots extending in the direction of the lenticular elements and transmitting only those light rays which have the same incidence on the original as had the light rays of each partial color on the original in taking, and a second diaphragm arranged between said source of light and said films at a distance from the printing film as has the multi-color filter in projection and having slots extending in the direction of the lenticular elements of the printing film and transmitting only those light rays which have the same incidence on the printing film as have the light rays of each partial color picture on the print in projection, so that the incidence of the light rays projected on the printing film is changed to a predetermined value corresponding to the incidence of the light rays of each partial color to be used on the printed film in projection.

6. A process of printing lenticular film on lenticular film which comprises arranging a lenticular film bearing an original in contact with a lenticular printing film so that the lenticular elements form an angle and the smooth side of the original faces the embossed side of the printing film, illuminating the films under local separation of the colors in the direction at right angles to the lenticular elements with respect to the original and the printing from the optical position corresponding with that of the exposure filter with respect to the original in taking, and changing this optical position with respect to the printing film to a predetermined value to be used in projecting the printed film.

7. A process of printing lenticular film on lenticular film which comprises arranging a lenticular film bearing an original in contact with a lenticular printing film so that the lenticular elements form an angle and the smooth side of the original faces the embossed side of the printing film, exposing the film to a source of light through a diaphragm occupying the same optical position with respect to the original film as did the exposure filter during taking and having apertures arranged stepwise and corresponding in number with the number of the color areas of the exposure filter, and changing the optical position of the diaphragm with respect to the printing film to a predetermined value to be used in projecting the printed film.

8. A process of printing lenticular film on lenticular film which comprises arranging a lenticular film bearing an original in contact with a lenticular printing film so that the lenticular elements form an angle and the smooth side of the original faces the embossed side of the printing film, exposing the film to a source of light through a diaphragm occupying the same optical position with respect to the original film as did the exposure filter during taking and having apertures arranged stepwise and corresponding in number with the number of the color areas of the exposure filter, and altering the optical position of the diaphragm with respect to the printing film so that the distance between lines drawn through the centers of the apertures parallel to the axes of the lenticular elements of the printing film differs by a predetermined amount from the distance between the lines drawn through the centers of the apertures of the diaphragm parallel to the axes of the lenticular elements of the original film.

9. A process of printing lenticular film on lenticular film which comprises arranging a lenticular film bearing an original in contact with a lenticular printing film so that the lenticular elements form an angle and the smooth side of the original faces the embossed side of the printing film, exposing the film to a source of light through a diaphragm occupying the same optical position with respect to the original film as did the exposure filter during taking and having apertures arranged stepwise and corresponding in number with the number of the color areas of the exposure filter, and through a further diaphragm occupying the same optical position with respect to the printing film as corresponds with the desired optical position of the projection filter, different from that of the taking filter, with respect to the print during projection and having apertures arranged stepwise and corresponding in number with the number of color areas of the projection filter.

JOHN EGGERT.
GERD HEYMER.